United States Patent [19]

Simon

[11] 4,019,583
[45] Apr. 26, 1977

[54] SAFETY TANK AND FIRE EXTINGUISHER

[76] Inventor: Sidney Simon, 936 Ornmore St., Pittsburgh, Pa. 15201

[22] Filed: Feb. 26, 1976

[21] Appl. No.: 661,754

Related U.S. Application Data

[63] Continuation-in-part of Ser. No. 624,161, Oct. 20, 1975, which is a continuation-in-part of Ser. No. 550,889, Feb. 19, 1975, Pat. No. D240,903.

[52] U.S. Cl. .................................. 169/62; 169/66; 169/11; 220/88 B
[51] Int. Cl.² .......................................... A62C 35/12
[58] Field of Search ............... 169/62, 5, 11, 12, 66, 169/9; 220/88 R, 88 B

[56] References Cited

UNITED STATES PATENTS

| | | | |
|---|---|---|---|
| 1,347,057 | 7/1920 | Ross | 169/62 X |
| 3,103,296 | 9/1963 | Gour | 169/4 X |
| 3,764,035 | 10/1973 | Silverman | 220/88 R X |

*Primary Examiner*—John J. Love
*Assistant Examiner*—Michael Mar
*Attorney, Agent, or Firm*—Gipple & Hale

[57] ABSTRACT

An improved gasoline safety tank and fire extinguisher comprising a tank body with interchangeable inlet and outlet fittings secured thereto, an intermediate container mounted in the tank for holding gasoline, and a carbon dioxide bottle mounted in the intermediate container. A conduit is connected to an inlet fitting and extends into the intermediate container adjacent the floor of the intermediate container and below the level of liquid placed in the intermediate container. A pressurized carbon dioxide bottle is selectively connected to the inlet fitting and adapted to discharge pressurized carbon dioxide gas into the intermediate container so that the gas bubbles up through the liquid in the intermediate container into the top of the intermediate container simultaneously cooling the liquid and pressurizing the liquid in the intermediate container. The carbon dioxide bottle is connected to the tank to pressurize a foam placed in the space defined by the outer wall of the intermediate container and the inner wall of the tank body so that the foam will be expelled from the tank when the tank wall is punctured. A flexible hose is mounted to the tank body for connection to the carbon dioxide bottle so that carbon dioxide can be discharged from the bottle to fill tires and the like. Another flexible hose is selectively mounted on the opposite side of the tank and connected to a fitting having a connected conduit which extends into the space defined by the outer wall of the intermediate container and the inner wall of the tank. The foam pressurized by the carbon dioxide can selectively be discharged through the hose from the tank for fire extinguishing purposes.

14 Claims, 3 Drawing Figures

SAFETY TANK AND FIRE EXTINGUISHER

CROSS REFERENCE TO THE RELATED APPLICATION

This is a continuation-in-part of application Ser. No. 624,161 filed Oct. 20, 1975 now pending, which is a continuation-in-part of application Ser. No. 550,889 filed Feb. 19, 1975 now U.S. Pat. No. Design 240903 as of 8-10-76.

BACKGROUND OF THE INVENTION

The invention generally relates to containers for combustible liquids and more specifically relates to a combination safety storage tank and fire extinguisher which is constructed so that the explosion hazards inherent in the design of a storage tank are eliminated allowing the storage tank to be used in an automobile, airplane, motor boat, or other moving vehicle or simply as a storage device.

The safety storage tank is normally used for the storing of volatile fuels such as gasoline. In ordinary conditions of the storage of gasoline, air usually enters the tank as the gasoline is removed from the tank. Under such conditions the upper part of the partially filled tank contains a dangerous explosive mixture of gasoline vapor and air. If a spark occurs in the upper part of the tank through an electrical discharge of static electricity or from contact with other structures, fire and explosion will result.

The present invention eliminates this explosive hazard by unique construction of the tank in that the air is replaced in the space above the gasoline by an inert gas such as carbon dioxide which is heavier than air and which will not form an explosive mixture with the gasoline. The carbon dioxide is pressurized and attached to the tank so that it automatically replaces the gasoline as the gasoline is discharged from the tank.

The invention is also provided with a release valve which will allow excess pressure and air from inside the tank to escape. A pressure indicating gauge is connected to the release valve or to the tank to indicate to the operator or owner of the tank the current pressure in the tank. The invention also has the dual function as a fire extinguisher as the pressurized carbon dioxide is also used to expel an inert foam held in the tank.

DESCRIPTION OF THE PRIOR ART

It is known in the prior art to place an inert gas in a storage tank to alleviate the explosive characteristics of the tank. U.S. Pat. No. 2,153,555 discloses a tank in which the area in the space above the gasoline is replaced by an inert gas which is carbon dioxide. In this patent the gasoline is withdrawn by a pipe (not shown) and the carbon dioxide is used to fill the vacuum created in the tank by the discharged gas. A similar system is shown by U.S. Pat. No. 2,406,373 which discloses a fixed fuel vapor purging apparatus with a vapor diluting medium such as carbon dioxide under pressure. Another system is shown by U.S. Pat. No. 3,606,709 which teaches that there is a danger of an explosion in such a tank through the accumulation of static electricity built up by the incoming inert gas in the tank. This patent teaches that static electricity can build up into a spark discharge especially when gas input velocity is high and the carbon dioxide is derived from a source in liquid or solid state. This problem is solved by the use of the fixed emergency discharge facility which eliminates the spark discharge through the use of a complex bath expansion chamber mounted on the roof of the tank.

In any of the above described tanks a puncture of the tank will result in the pressurized gas propelling the gasoline out of the tank in a high pressure stream.

If this stream of fuel is ignited by a spark, static electricity, heated manifold or other fire inducing medium the result is much like a flame thrower in that all areas in the path of the fuel stream are ignited by a burning fuel. Thus while the danger of fuel explosion has been decreased within the tank the danger of combustion outside the tank is greatly increased upon rupture of the tank. The present invention overcomes this problem by providing a safety tank which significantly eliminates the danger of internal and external combustion while providing the option of using the tank as a fire extinguisher or a device to inflate flat tires.

SUMMARY OF THE INVENTION

The present invention utilizes a specific construction so that the combination of the carbon dioxide with the gasoline and the input of carbon dioxide overcomes previous problems found in the prior art. In the present invention the carbon dioxide conduit used to pressurize the gasoline is positioned inside the tank body and extends below the surface of the liquid fuel or gasoline to cool the fuel and discharge static electricity carried by the gas before the carbon dioxide gas contacts the vapor zone of the tank. This gas flow conduit serves as both a carbon dioxide gas flow conduit and a fuel carrying conduit depending upon its intended use. When the conduit operates to carry carbon dioxide gas, the gas is bubbled up through the gasoline cooling the gasoline and thereby keeping the fuel vapors down. This under liquid ejection prevents the heavier carbon dioxide from forming an air lock, thus preventing one source of explosion.

When the conduit operates as a fuel carrying conduit the carbon dioxide previously entrained in the pipe when the tank was initially pressurized operates as a safety device against leakage since the carbon dioxide will be expelled before the gasoline thus making it easier to determine leakage before gasoline leakage actually takes place.

Furthermore, the use of a pressurized foam compartment through the novel design of the tank reduces the danger from puncture of the outer tank wall and acts as a fire extinguisher if an outer blaze arises. If the gasoline or inner fuel container is also punctured the foam mixes with the fuel to retard combustion of the fuel as it is expelled into the atmosphere.

The use of a flexible conduit attached to the input-output valve of the foam container area allows the tank to be used safely as a fire extinguisher in case of emergency.

A conduit extends into the foam compartment through which the foam is expelled. A flexible hose is connected to the conduit, the nozzle of which can then be directed to the situs of a fire.

A flexible hose can also be attached to the output valve of the carbon dioxide bottle in order to allow the carbon dioxide gas to be expelled under pressure for pressurization needs.

The invention will further be described with reference to the accompanying drawings of which:

DETAILED DESCRIPTION OF THE DRAWINGS

Figure 1:
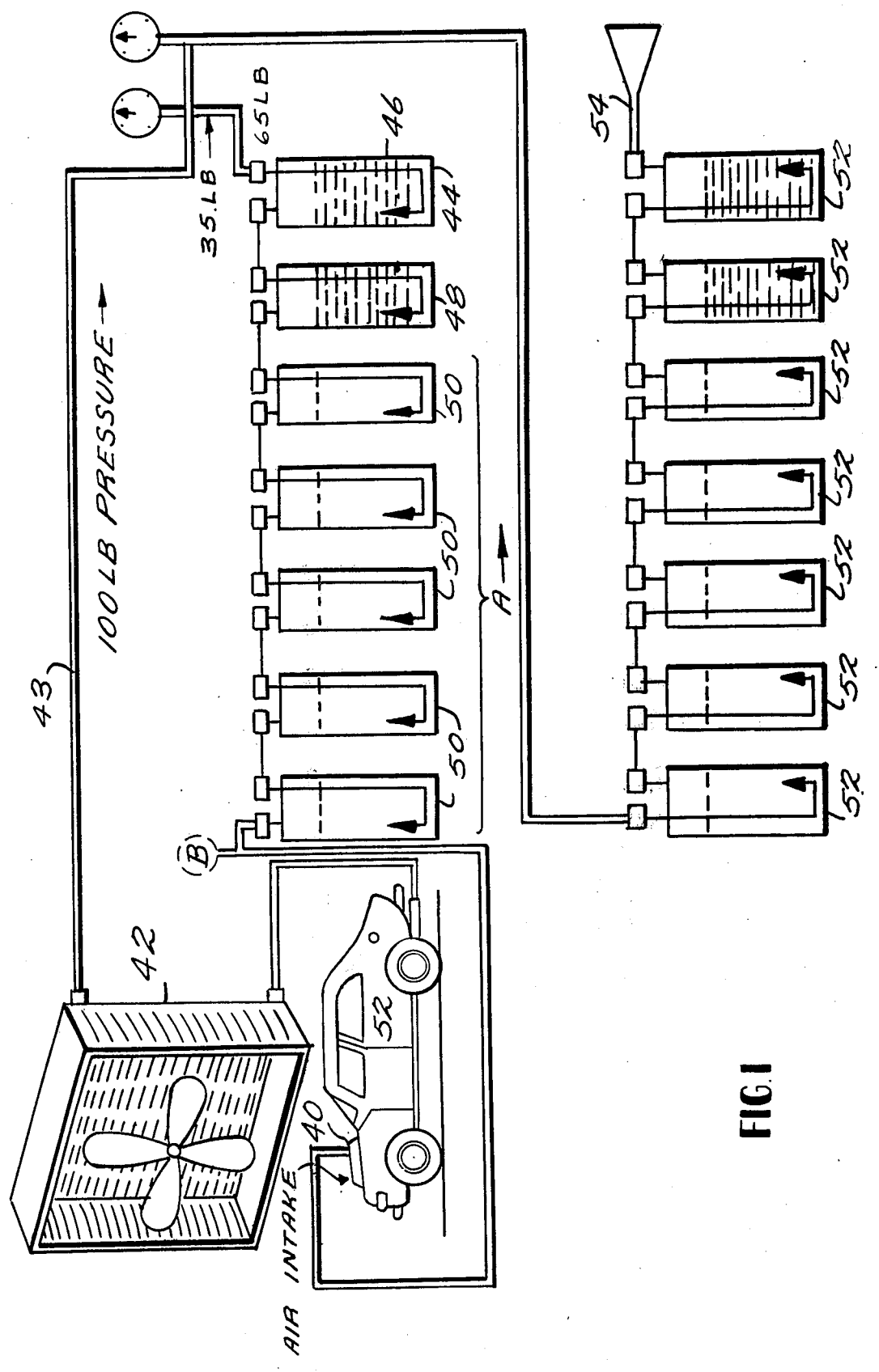
FIG. 1 discloses a schematic utilization of a tank system of the invention partially in perspective.

The present invention as shown by the drawings discloses a safety tank 10 comprising a tank body 60, an intermediate smaller diameter cylindrically shaped container 62 mounted within the body 60 and a pressurized gas container 64 mounted in the cylindrical shaped container 62. While the present invention in its preferred embodiment is constructed of these basic compartments the intermediate container can be integrally formed with the outer wall of the tank to form a double walled tank as shown by connection 61. The intermediate container 62 or inner wall of the double walled tank can be provided with a seat or support to hold the gas pressure container. Alternatively, the tank 10 can be provided with a removable manifold 11 which can be screwed onto the tank body. While such a manifold would provide easy access to the intermediate container it is envisioned that the intermediate container 62 and/or gas pressure container is mounted to the manifold for support.

The intermediate cylindrical shaped container must have a wall thickness which provides suitable support to maintain gasoline contained therein under 100 psi pressure. While it has been found that the invention has worked well under a 60 psi pressure the intermediate container should be capable of holdng at least a 250 psi pressure. Thus any material such as plastic or metal which would be able to withstand pressures of this magnitude and not be affected by the corrosive nature of the various volatile fuels would be acceptable.

Two carrying handles 70 are provided upon the upper or outer surface of the tank body 60 for facilitating transportation of the portable tank and brackets 71 are secured to the outer surface of the tank to hold the flexible discharge hoses.

Figure 3:
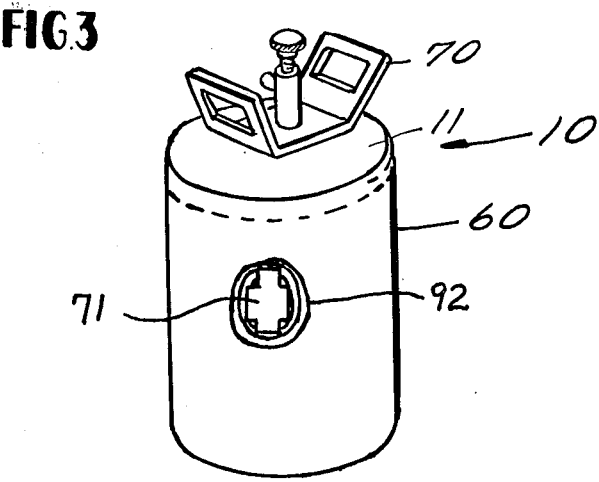
FIG. 3 discloses a perspective view of the storage tank.

A gasoline inlet valve 72, is built adjacent the tank body and above the upper surface of the intermediate container 62. The valve 72 is constructed to receive a funnel, through which gasoline may be poured for filling the tank. Two gauges, 74 and 76, are connected to the gas pressure container 64 by gauge conduit 78. The upper gauge 74 indicates the exiting gas pressure, and is provided with a screw as shown in FIG. 3 for adjusting the pressure of the exiting gas. The other gauge 76 indicates the internal cylinder pressure of the gas being held under pressure. A quick disconnect coupling 79 is connected to the conduit 78 and is provided with manual valve means 81 to allow discharge of the pressurized gas from container 64.

Figure 2:
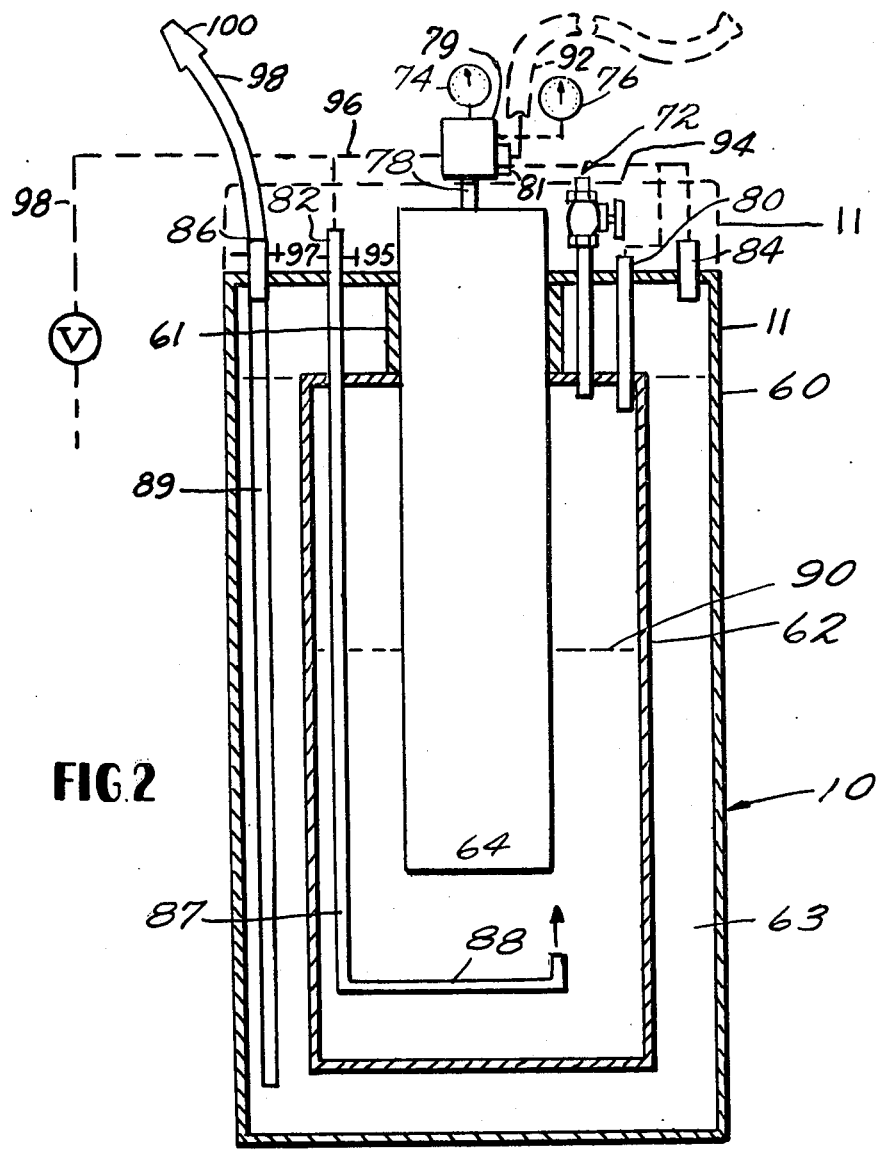
FIG. 2 shows a schematic cross-sectional view of a storage tank.

Four quick disconnect couplings 80, 82, 84 and 86 are provided on the upper surface of the tank body 60. These couplings are fitted with necessary valves, as shown in FIG. 2. Disconnect couplings 80 and 82 are mounted on the upper surface of the tank body above intermediate container 62 and extend into the interior of the intermediate container 62. The couplings are used for the inlet and outlet fittings for the intermediate container. Conversely disconnect couplings 84 and 86 provide inlet and outlet fittings for the tank body interior. Conduit 89 extends from coupling 86 into the lower portion of the compartment 63. An L-shaped conduit 87 with an extension 88 extends down into the interior of the intermediate container 62 from disconnect coupling 82. The extension or leg 88 is substantially parallel to the bottom of the intermediate container and carries the pressurized gas into the intermediate container 62 so that the exiting gas rises from a level beneath the gasoline level 90. The source of the gas pumped into the conduit 87 may be from an exterior gas source but is preferably from a source 64. The pressurized gas is transported through a flexible transfer conduit 96.

A flexible hose 92 is connected by one end to the gauge conduit 78. This hose is shown in coiled position in FIG. 3 on bracket 71 and shown in phantom in FIG. 2 in operative communication with valve discharge means 81 to provide a conduit through which the pressurized gas flows if discharge of such is necessary to inflate a tire or other article.

In operation, gasoline or any other volatile liquid is poured into the intermediate container 62 through a valve 72 which additionally functions as a vapor bleed-out valve for the intermediate container. The gasoline level is indicated by line 90. Carbon dioxide, nitrogen, or any other suitable inert gas is provided in the inner container 64 by prefilling the container from the exterior source of gas and inserting the container or cartridge 64 into the tank. A compartment 63 formed by the inner surface of the tank body and outer surface of the intermediate container is filled with foam pressurized by an inert gas such as carbon dioxide through disconnect coupling 84 via line 94. A vapor bleed-off valve can be connected to one of the disconnect couplings to allow vapor to escape to the atmosphere.

The intermediate container 62 communicates with the carbon dioxide bottle during its initial pressurization so that the cold carbon dioxide is passed into the gasoline tank 62 by rotating valve 81 which directs the carbon dioxide through conduit 96 into conduit 87 and bubbles up through the gasoline or volatile liquid to the top of the intermediate container.

When the carbon dioxide is discharged into the bottom of the tank the gas vapors rise, opening a pre-set pressure bleeder valve 72 which lets the excess air out of the intermediate container so that there will be no air locks. Since the air is lighter than the carbon dioxide the air will be forced upward and out of the bleeder valve 72. The elimination of air locks cuts down the potential of explosions. This bubbling cools the volatile liquid and diminishes the occurrance of a gasoline vapor-carbon dioxide environment in the top of the intermediate container since the cooler the gasoline the lower the vapor pressure. This further eliminates possible explosions when spark discharges occur. Furthermore, the bubbling provides an effective means of discharging static electricity within the intermediate container as the static electricity created by the incoming carbon dioxide is discharged within the liquid. Thus there is no build-up of static electricity causing a discharge spark to go into the vapor which is highly explosive. A gauge is placed on the connection so that the pressure of the gas on the liquid gasoline or the pressure under which the gasoline is placed can be quickly determined. One or more tanks may be interlocked together by flexible conduits and used with their own pressure. Thus an interlocking pressurized system can be formed.

Gasoline can be transported out of the tank to another tank or receptacle by connecting the interior cylinder 64 to the intermediate disconnect coupling 80. The carbon dioxide passes from the interior container 64 through a coupling conduit 94 to the disconnect coupling 80 keeping the gasoline pressurized as it flows through the L-shaped conduit 87 of the intermediate container 62 into hose 98 which can be selectively placed on couplings 82 or 86. The interior container 64 or carbon dioxide bottle is adapted to flow at a high or low rate into the tank 63, intermediate container 62, or flexible hose 92 by rotating valve 81 so that the carbon dioxide bottle selectively communicates with conduits 96, 94 and 92 as desired by the operator.

Should the tank body 60 become punctured, rupturing only the tank wall, then the foam and inert gas of compartment 63 will merely discharge through the puncture at a high pressure. The intermediate container 62 and the interior gas container 64 will remain, however, under pressure independently and therefore cause no danger to the surrounding environment. If the puncture should cause a hole through both the tank wall and the intermediate container 62, then the volatile gas liquid would be forced by pressure through the rupture hole at the intermediate container wall interface to contact the foam held in the compartment 63. The foam and the volatile gas will become thoroughly mixed as the foam acts upon the volatile liquid and when the mixture exits through the puncture in the tank wall the mixture will be a relatively safe non-volatile neutralized substance.

While the safety tank is being transported it is also available for use as an emergency fire extinguisher. A flexible hose 98 mounted to the tank surface on brackets 71 is connected to quick disconnect coupling 86. The carbon dioxide gas from the bottle 64 has previously pressurized the foam contained in the area 63 defined between the outer wall of intermediate container 62 and the tank wall 60 through conduit 94. If a fire occurs then the turn screw 97 of conduit 86 is opened. This causes the pressurized foam to be forced through conduit 86, through flexible hose 98 and through the nozzle 100. Consequently, the foam will extinguish the fire when applied directly to the fire.

It should be noted that flexible hose 98 can also be used on coupling 82 so that gasoline can be poured out of the container 62 when turn screw 95 is opened.

If the gas tank is in transit within a motor vehicle then it is also possible to use the gas tank as an emergency air or gas supply to fill up any flat tires. The flexible hose 92 is connected directly to the tire that needs additional gas pressure. Valve 81 is turned so as to release gas from the bottle 64. The gas passes through conduit 92 and will fill up the tire as the pressure within the bottle is greater than the pressure of motor vehicle tires.

The system as is shown in FIG. 1 discloses carbon monoxide fed into a series of tanks. The carbon monoxide bubbles up through a plurality of gasoline filled tanks to provide a fuel laden vapor which passes into a carburetor 40 or other suitable device where it is subsequently ignited.

After the vapor fuel has been ignited the exhaust gases, which contain carbon monoxide as a constituent, are passed through a radiator 42 which cools the gas. The cooler gas is carried by conduit 43 to a point along the conduit where the exhaust gas is apportioned through suitable valving in relation to its pressure. A portion of the exhaust gas, as is arbitrarily shown, is recirculated into the containers 44, 48 and 50, as will be subsequently discussed. The remainder portion of the exhaust gas is fed by a conduit into a series of water containers 52. The exhaust gas, passing through the water tanks, picks up additional water vapor and oxygen vapor as the gas continues to pass through each successive tank. Consequently the exhaust product as purified, passes through a valve 54 where it finally exhausts into the atmosphere.

The water filtering tank 44 contains water 46 to clean the carbon monoxide of carbon and associated solids and other undesirable resultant vapors.

The exhaust gases bubble up through the water from the bottom of the tank, which cleans the gases while creating an oxygen vapor at the top of the tank above the water surface. A second tank 48, connected to the top of the filtering tank contains a dryer filter of cotton or other suitable composition which will take the water out of the vapor which has passed from the filtration tank 44. A plurality of gasoline tanks 50 connected in series and containing gasoline communicate with the dryer tank 48. As the gas is bubbled into each successive gasoline tank, the resulting vapor mixture is enriched as each successive gasoline tank acts as a booster. When the oxygenized vapor is bubbled through the first gasoline tank 50, an insufficient gas vapor mixture, for combustion purposes, is formed at the top of the tank. The second gasoline tank 50, in series, increases the combustion quality of the fuel mixture with the third tank of the series forming the critical booster in which a gas vapor mixture of sufficient quality is formed so that an efficient combustion level is reached. When the bubbling vapor gas has proceeded through the fourth tank and has reached the top of the fifth tank for entrance to the carburetor 40 or other fuel mixing systems an almost 100% effective burn is achieved upon ignition in the automobile 52. Thus the five gasoline tanks generate a vapor fuel mixture of gasoline, oxygen, and vaporized hydrocarbons to give a superior combustion fuel.

If desired the cleaning and filtration process can be accomplished by utilizing standard air filtration means in tank 44. It is apparent of course, that a filter cartridge or other removable filter can be easily inserted in the tank so that a manifold containing the quick disconnect couplings can be lifted off the tank for easy replacement of the filtration system.

Thus it can be seen that many commercial uses are readily adaptable from the present invention in the transfer of volatile fluids from various areas and also in the transfer of volatile fluids for combustion.

While the preferred embodiment of the invention has been disclosed it is understood that the invention is not limited to such an embodiment since it may be otherwise embodied in the scope of the appended claims.

What is claimed is:

1. A combination gasoline safety tank and fire extinguisher comprising a double walled tank body the inner wall of which forms a container, a manifold removably mounted to said tank body, inlet means mounted to said manifold, outlet means mounted to said manifold, said inlet means and outlet means being interchangeable and adapted to receive and discharge fluid, a conduit connected to said inlet means and extending into the area formed by the inner surface of the container, a pressurized gas source means mounted to said manifold and placed within said container and selectively connected to said inlet means to discharge pressurized inert gas into said container through said conduit so that said inert gas bubbles up through a liquid contained in said container into the top of the container cooling said liquid and pressurizing the liquid in said tank, said double walled tank body forming an outer compartment substantially surrounding said container filled with an incombustible material pressurized by said pressurized gas source, a second conduit located within said outer compartment and discharge means mounted to said tank body adapted to selectively discharge pressurized gas from said gas source, liquid from said container and incombustible material from said outer compartment.

2. A combination gasoline safety tank and fire extinguisher as claimed in claim 1 wherein said inert gas source communicates with said outer compartment to pressurize said compartment.

3. A combination gasoline safety tank and fire extinguisher as claimed in claim 1 wherein said conduit is L-shaped with the bottom leg of the L being substantially parallel to the bottom of said container.

4. A combination gasoline safety tank and fire extinguisher as claimed in claim 1 wherein said inlet means and said outlet means have quick disconnect means.

5. A combination gasoline safety tank and fire extinguisher as claimed in claim 1 wherein said incombustible material is a liquid foam.

6. A combination gasoline safety tank and fire extinguisher as claimed in claim 1 wherein said pressurized inert gas source means comprises a pressurized carbon dioxide bottle.

7. A combination gasoline safety tank and fire extinguisher as claimed in claim 6 wherein said pressurized carbon dioxide bottle includes discharge means for discharging the carbon dioxide from said bottle and is adapted to be used to inflate tires, said flexible means comprising a hose provided with a quick disconnect coupling adapted to communicate with said carbon dioxide bottle and a nozzle.

8. A combination gasoline safety tank and fire extinguisher as claimed in claim 7 wherein said inlet and outlet means quick disconnect sections are adapted to mate with a discharge means comprising a flexible discharge hose having a quick disconnect connection on one end to communicate with said conduit.

9. A portable combination safety tank and fire extinguisher comprising a tank body, an intermediate container mounted inside said tank body, an interior container mounted in said intermediate container, means in said intermediate container to receive a volatile liquid into its interior, said interior container containing a pressurized inert gas heavier than air, conduit means connecting said interior container to said intermediate container, a second conduit connecting said interior container allowing communication of the gas of said interior container with the area defined by the inner wall of the tank body and the outer wall of the intermediate container and a fire resistant foam material placed in the compartment defined by the inner surface of said tank body and the outer surface of said intermediate container and discharge means mounted to said tank body, said discharge means being selectively adapted to communicate with said intermediate container interior and said tank body interior to discharge the material contained therein, said discharge means comprising a flexible hose having quick disconnect means on one end and nozzle means on the other end.

10. A combination gasoline safety tank and fire extinguisher as claimed in claim 9 wherein the pressurized inert gas is carbon dioxide.

11. A combination gasoline safety tank and fire extinguisher as claimed in claim 9 including a conduit connected to an inlet formed in said intermediate container, said conduit being L-shaped with the bottom leg of the L being substantially parallel to the bottom of said intermediate container.

12. A combination gasoline safety tank and fire extinguisher as claimed in claim 9 wherein the pressurized inert gas is nitrogen.

13. A combination gasoline safety tank and fire extinguisher as claimed in claim 9 wherein the pressurized inert gas is carbon dioxide.

14. A combination gasoline safety tank and fire extinguisher as claimed in claim 9 including a second conduit connected to the tank body and extending into a compartment formed by the inner wall of the tank body and the outer wall of the intermediate container, said conduit extending past the bottom of the intermediate containers.

* * * * *